US008214296B2

(12) United States Patent
Frank et al.

(10) Patent No.: US 8,214,296 B2
(45) Date of Patent: Jul. 3, 2012

(54) DISAGGREGATED SECURE EXECUTION ENVIRONMENT

(75) Inventors: Alexander Frank, Bellevue, WA (US); Curt A. Steeb, Redmond, WA (US); Isaac P. Ahdout, Bellevue, WA (US); Richard B. Thompson, Bellevue, WA (US); Thomas G. Phillips, Bellevue, WA (US); William J. Westerinen, Sammamish, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 11/353,675

(22) Filed: Feb. 14, 2006

(65) Prior Publication Data

US 2007/0192825 A1    Aug. 16, 2007

(51) Int. Cl.
  G06F 21/00    (2006.01)
(52) U.S. Cl. ............... 705/52; 705/59; 705/57; 713/324
(58) Field of Classification Search ............. 705/50–59; 726/1–21; 713/2, 150–184, 324
  See application file for complete search history.

(56) References Cited

U.S. PATENT DOCUMENTS

| 5,615,263 | A |   | 3/1997  | Takahashi |              |
|-----------|---|---|---------|-----------|--------------|
| 5,617,576 | A | * | 4/1997  | Solari et al. | 712/40 |
| 5,742,236 | A |   | 4/1998  | Cremers   |              |
| 5,751,975 | A | * | 5/1998  | Gillespie et al. | 710/315 |
| 5,958,058 | A | * | 9/1999  | Barrus    | 713/320     |
| 6,038,551 | A | * | 3/2000  | Barlow et al. | 705/41 |
| 6,064,254 | A | * | 5/2000  | Vogley et al. | 327/565 |
| 6,170,049 | B1 | * | 1/2001  | So        | 712/35      |
| 6,292,569 | B1 |   | 9/2001  | Shear     |              |
| 6,460,136 | B1 | * | 10/2002 | Krohmer et al. | 713/2 |
| 6,671,813 | B2 |   | 12/2003 | Ananda    |              |
| 6,742,173 | B2 | * | 5/2004  | Spivey    | 716/16      |
| 6,823,433 | B1 | * | 11/2004 | Barnes et al. | 711/163 |
| 6,839,849 | B1 | * | 1/2005  | Ugon et al. | 726/20    |
| 6,950,937 | B2 |   | 9/2005  | Jakobssen |              |
| 6,957,332 | B1 |   | 10/2005 | Ellison   |              |
| 7,024,564 | B2 | * | 4/2006  | Pavlin et al. | 713/192 |
| 7,401,230 | B2 | * | 7/2008  | Campbell et al. | 713/190 |
| 7,660,984 | B1 | * | 2/2010  | Master    | 713/164     |

(Continued)

FOREIGN PATENT DOCUMENTS

EP    1168141 A2  *  1/2002

(Continued)

OTHER PUBLICATIONS

Derfler, "How Networks Work", Bestseller Edition, 1996, Ziff-Davis Press, Emeryville, CA, all pages.*

(Continued)

*Primary Examiner* — James A Reagan
*Assistant Examiner* — Calvin K Cheung

(57) ABSTRACT

An electronic device, such as, a computer, may be adapted for self-monitoring for compliance to an operating policy. The operating policy may specify a pay-per-use or subscription business model and measurements associated with compliant usage. A secure execution environment may measure usage in accordance with the business model as well as monitor and enforce compliance to the operating policy. To increase the difficulty of attacking or otherwise disabling the secure execution environment, elements of the secure execution environment may be distributed. The distribution points may include other functional elements of the computer, such as interface circuits, or may even be remotely located over a network. An implementation method for disaggregating the secure execution environment is also disclosed.

17 Claims, 7 Drawing Sheets

U.S. PATENT DOCUMENTS

| | | | |
|---|---|---|---|
| 2001/0007133 A1 | 7/2001 | Moriconi et al. | |
| 2002/0138726 A1 | 9/2002 | Sames et al. | |
| 2002/0178271 A1* | 11/2002 | Graham et al. | 709/229 |
| 2003/0056136 A1* | 3/2003 | Aweya et al. | 713/400 |
| 2003/0188169 A1* | 10/2003 | Strongin et al. | 713/181 |
| 2003/0188178 A1* | 10/2003 | Strongin et al. | 713/193 |
| 2003/0226014 A1* | 12/2003 | Schmidt et al. | 713/164 |
| 2003/0226022 A1* | 12/2003 | Schmidt et al. | 713/189 |
| 2004/0030907 A1* | 2/2004 | Dariel | 713/189 |
| 2004/0039924 A1* | 2/2004 | Baldwin et al. | 713/189 |
| 2004/0039926 A1* | 2/2004 | Lambert | 713/189 |
| 2004/0054893 A1 | 3/2004 | Ellis | |
| 2004/0054894 A1* | 3/2004 | Lambert | 713/165 |
| 2004/0064689 A1* | 4/2004 | Carr | 713/154 |
| 2004/0093505 A1* | 5/2004 | Hatakeyama et al. | 713/189 |
| 2004/0158840 A1* | 8/2004 | Rothman et al. | 719/321 |
| 2004/0177342 A1 | 9/2004 | Worley | |
| 2005/0010804 A1* | 1/2005 | Bruening et al. | 713/200 |
| 2005/0033969 A1* | 2/2005 | Kiiveri et al. | 713/189 |
| 2005/0223220 A1 | 10/2005 | Campbell | |
| 2005/0278553 A1 | 12/2005 | Wu | |
| 2005/0289355 A1* | 12/2005 | Kitariev et al. | 713/182 |
| 2006/0020550 A1 | 1/2006 | Fields et al. | |
| 2006/0147043 A1* | 7/2006 | Mann et al. | 380/270 |
| 2007/0078957 A1* | 4/2007 | Ypya et al. | 709/222 |
| 2007/0106986 A1* | 5/2007 | Worley, Jr. | 718/1 |
| 2007/0162964 A1* | 7/2007 | Wang et al. | 726/5 |
| 2007/0283361 A1* | 12/2007 | Blanchet et al. | 718/107 |
| 2009/0113536 A1* | 4/2009 | Zhang et al. | 726/12 |

FOREIGN PATENT DOCUMENTS

| | | |
|---|---|---|
| EP | 1862908 A1 * | 5/2007 |
| EP | 18629081 A1 * | 6/2007 |
| GB | 2365598 | 2/2002 |
| WO | WO0197441 | 12/2001 |
| WO | WO2009/027743 A2 * | 3/2009 |

OTHER PUBLICATIONS

White, "How Computers Work", Sixth Edition, 2002, Que Corporation, Indianapolis, IN, all pages.*

Gralla, "How the Internet Works", Millennium Edition, 1999, Que Corporation, Indianapolis, IN, all pages.*

Muller, "Desktop Encyclopedia of the Internet", 1999, Artech House Inc., Norwood, MA, all pages.*

Kiriansky, Secure Execution Environment via Program Sheparding, Feb. 2003, all pages.*

Herzog, Secure Execution Environment for Java Electronic Services, 2002, all pages.*

IEEE Standard for Vital ASIC (Application Specific Integrated Circuit) Modeling Specification, Sep. 28, 2001, all pages.*

"The Memory Management Glossary—M." Dated Feb. 8, 2002. Retrieved Mar. 22, 2010 via Wayback Machine.*

U.S. Appl. No. 60/401,753, filed Aug. 8, 2002. All pages.*

Written Opinion for PCT/US2007/002322 mailed Jul. 2, 2007.

International Search Report for PCT/US2007/002322 mailed Jul. 2, 2007.

Response filed in European Patent Application No. 07 749 397.1; Date Filed: Jul. 18, 2011.

Stack et al, "Bees: A Secure, Resource-Controlled, Java-Based Execution Environment," IEEE 2003; http://www.cs.utah.edufluxlpapers/bees-openarch03.pdf., Apr. 2003.

Bukhres et al., "InterBase: An Execution Environment for Heterogeneous Software Systems," IEEE 1993; http://ieeexplore.ieee.org/search/wrapper/jsp?amumber=2235444, Aug. 1993.

Thompson et al.; "Paper-Proceedings of the 8th USENIX Security, Aug. 23-26, 1999, Washington, D.C.,"; http://db.usenix.org/publications/library/proceedings/sec99/fulLpapers/thompson htmil.

Goldberg et al., A Secure Environment for Untrusted Helper Applications (Confining the Wily Hacker), Jul. 1996; http://www.usenix.org/publications/library/proceedings/sec96/full_papers/goldberg/goldberg.ps

* cited by examiner

DISAGGREGATED SECURE EXECUTION ENVIRONMENT

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates their account, and while the cellular telephone may power up, calls cannot be made because the service provider will not allow them. The deactivated phone has no "salvage" value, because the phone will not work elsewhere and the component parts do not have a significant street value. When the account is brought current, the service provider will re-allow use of the device to make calls.

This model works well when the service provider, or other entity taking the financial risk of providing subsidized hardware, has a tight control on the use of the hardware and when the device has little salvage value. The business model does not work well when the hardware has substantial uses outside the service provider's span of control. Thus, a typical computer does not meet these criteria since a computer may have substantial uses beyond an original intent and the components of a computer, e.g. a display or disk drive, may have a significant salvage value.

SUMMARY

An operating policy for a computer or a computer resource, particularly a pay-per-use or subscription computer or component, may define the rules for compliance with established business terms associated with the resource's acquisition, how to measure compliance to the rules, and what to do when the measurements indicate non-compliance. To monitor and enforce the operating policy, a secure execution environment may be employed. The secure execution environment may be a separate component or may be embedded within one of the other components of the computer. Because the secure execution environment may attract the attention of hackers and others with fraudulent motives, instead of a monolithic secure execution environment, the functions of a secure execution environment may be disaggregated among components of the computer. A core and various functions may be placed in different components, resulting in at least two possible benefits. One is spreading the targets of attack, requiring more resources and energy to disable or circumvent the secure execution environment. Another benefit involves the ability to require the components hosting the secure execution environment functions to be present and operational, reducing the value of individual components and thereby discouraging "chop shop" attacks.

A secure execution environment may be distinguished from a trusted computing base (TCB) or next generation secure computing base (NGSCB) in that the secure execution environment does not attempt to limit the features or functions of the computer, nor does it attempt to protect the computer from viruses, malware, or other undesirable side effects that may occur in use. The secure execution environment does attempt to protect the interests of an underwriter or resource owner to ensure that business terms, such as pay-per-use or subscriptions, are met and to discourage theft or pilfering of the computer as a whole or in part.

DETAILED DESCRIPTION OF VARIOUS EMBODIMENTS

Figure 1:
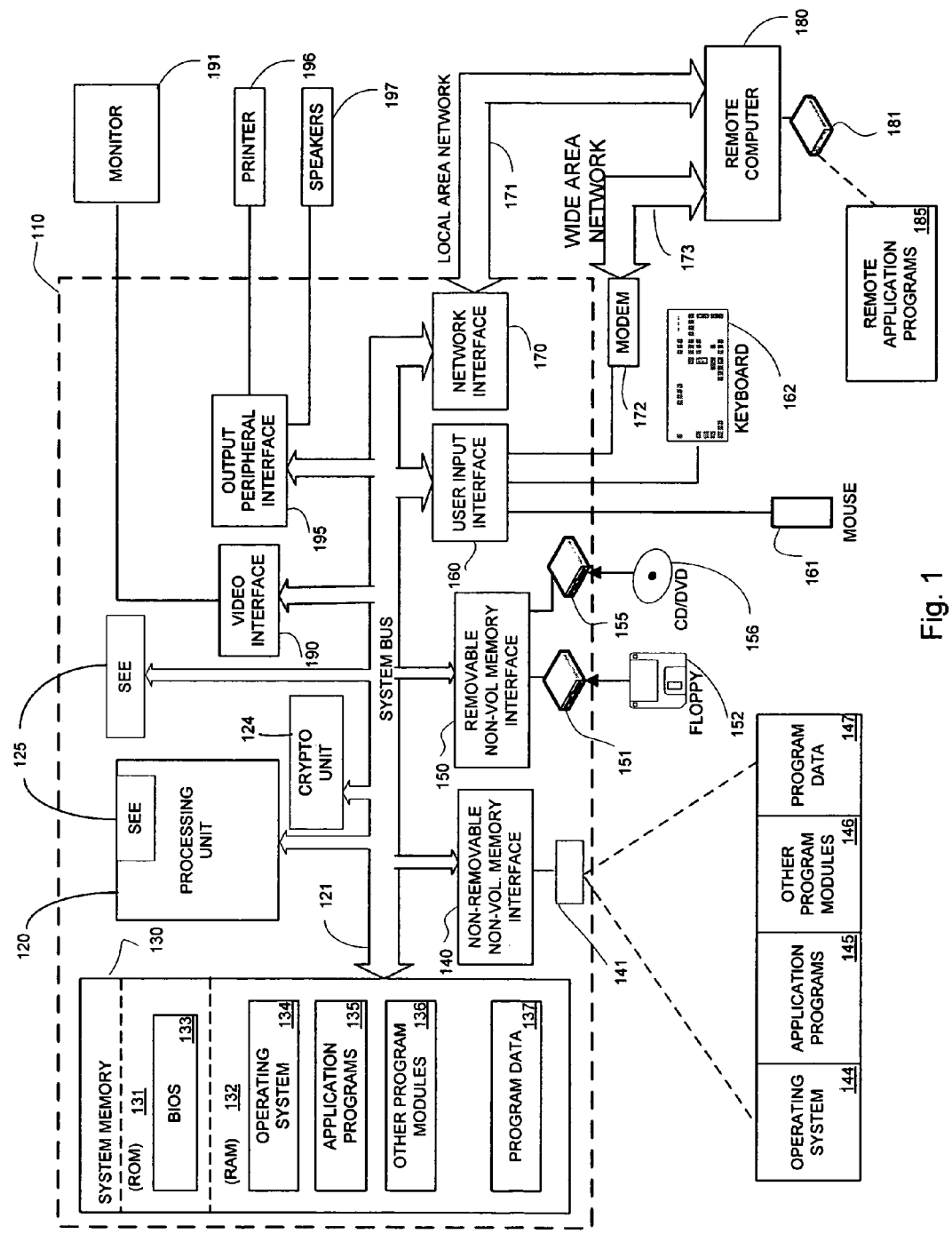
FIG. 1 is a functional block diagram of a computer.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using a sentence beginning: "As used herein, the term" and containing the phrase "is hereby defined to mean" or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance with the present invention, further discussion of such software and ICs, if any, will be limited to the essentials with respect to the principles and concepts of the preferred embodiments.

Many prior-art high-value computers, personal digital assistants, organizers and the like are not suitable for use in a pre-pay or pay-for-use business model as is. As discussed above, such equipment may have significant value apart from those requiring a service provider. For example, a personal computer may be disassembled and sold as components, creating a potentially significant loss to the underwriter of subsidized equipment. In the case where an Internet service provider underwrites the cost of the personal computer with the expectation of future fees, this "residual value" creates an opportunity for fraudulent subscriptions and theft. Pre-pay business models, where a user pays in advance for use of a subsidized, high value computing system environment have similar risks of fraud and theft.

FIG. 1 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 124 providing cryptographic services. Such services may include support for both symmetric and asymmetric cryptographic algorithms, key generation, random number generation and secure storage. Cryptographic services may be provided by a commonly available integrated circuit, for example, a smart chip such as those provided by Seimens™ or ST Microelectronics™.

The computer 110 may include a secure execution environment 125 (SEE). The SEE 125 may be enabled to perform security monitoring, pay-per-use and subscription usage management and policy enforcement for terms and conditions associated with paid use, particularly in a subsidized purchase business model. The secure execution environment 125 may be embodied in the processing unit 120 or as a standalone component as depicted in FIG. 1. The detailed functions that may be supported by the SEE 125 and additional embodiments of the SEE 125 are discussed below with respect to FIG. 3.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
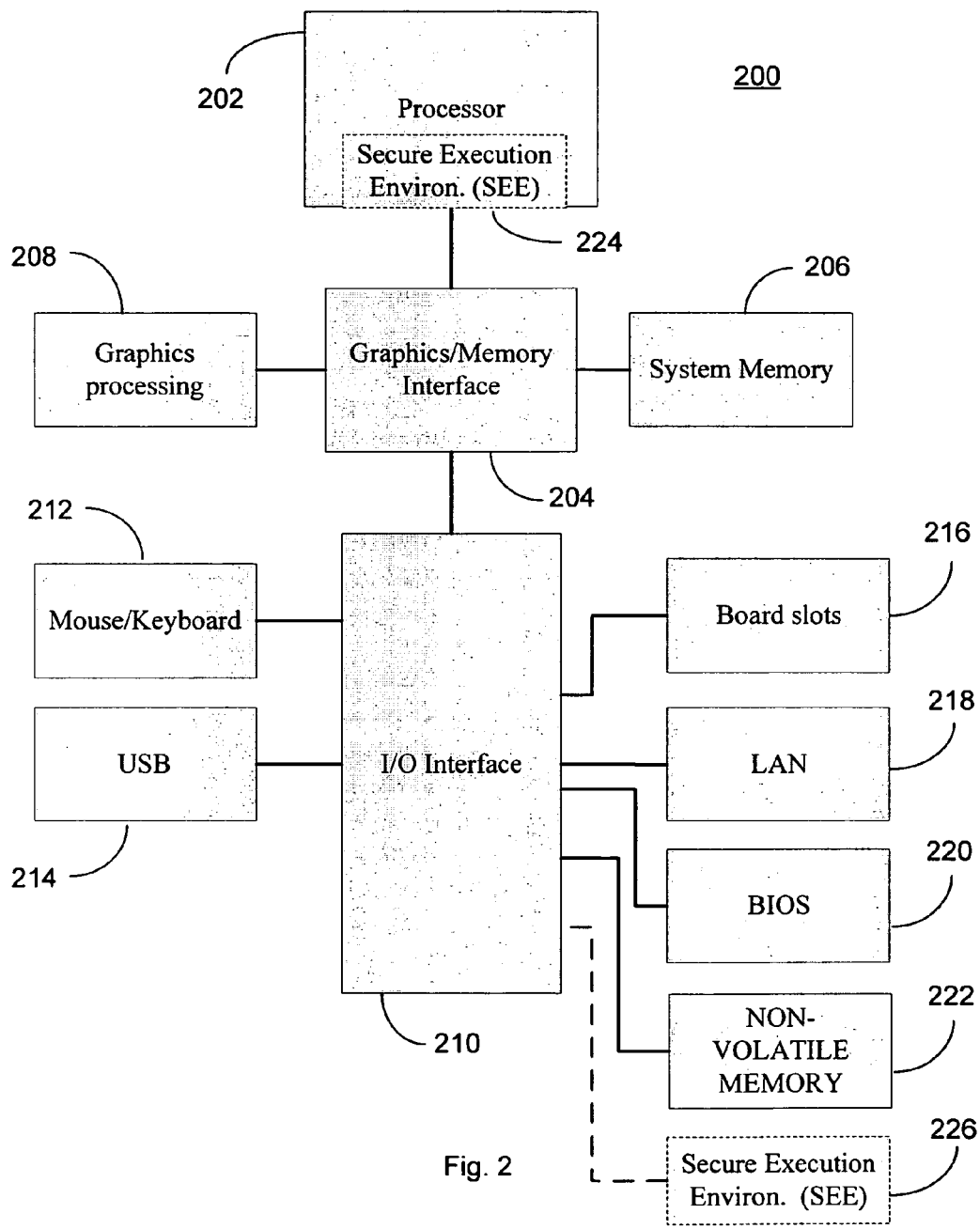
FIG. 2 is an architectural block diagram of the computer of FIG. 1.

FIG. 2 is an architectural block diagram of a computer 200 the same as or similar to the computer of FIG. 1. The architecture of the computer 200 of FIG. 2 may be typical of general-purpose computers widely sold and in current use. A processor 202 may be coupled to a graphics and memory interface 204. The graphics and memory interface 204 may be a "Northbridge" controller or its functional replacement in newer architectures, such as a "Graphics and AGP Memory Controller Hub" (GMCH). The graphics and memory interface 204 may be coupled to the processor 202 via a high speed data bus, such as the "Front Side Bus" (FSB), known in computer architectures. The graphics and memory interface 204 may be coupled to system memory 206 and a graphics processor 208, which may itself be connected to a display (not depicted). The processor 202 may also be connected, either directly or through the graphics and memory interface 204, to an input/output interface 210 (I/O interface). The I/O interface 210 may be coupled to a variety of devices represented by, but not limited to, the components discussed below. The I/O interface 210 may be a "Southbridge" chip or a functionally similar circuit, such as an "I/O Controller Hub" (ICH). Several vendors produce current-art Northbridge and Southbridge circuits and their functional equivalents, including Intel Corporation.

A variety of functional circuits may be coupled to either the graphics and memory interface 204 or the I/O Interface 210. The graphics and memory interface 204 may be coupled to system memory 206 and a graphics processor 208, which may itself be connected to a display (not depicted). A mouse/keyboard 212 may be coupled to the I/O interface 210. A universal serial bus (USB) 214 may be used to interface external peripherals including flash memory, cameras, network adapters, etc. (not depicted). Board slots 216 may accommodate any number of plug-in devices, known and common in the industry. A local area network interface (LAN) 218, such as an Ethernet board may be connected to the I/O interface 210. Firmware, such as a basic input output system (BIOS) 220 may be accessed via the I/O interface 210. Nonvolatile memory 222, such as a hard disk drive, may also be coupled to the I/O interface 210.

Figure 3:
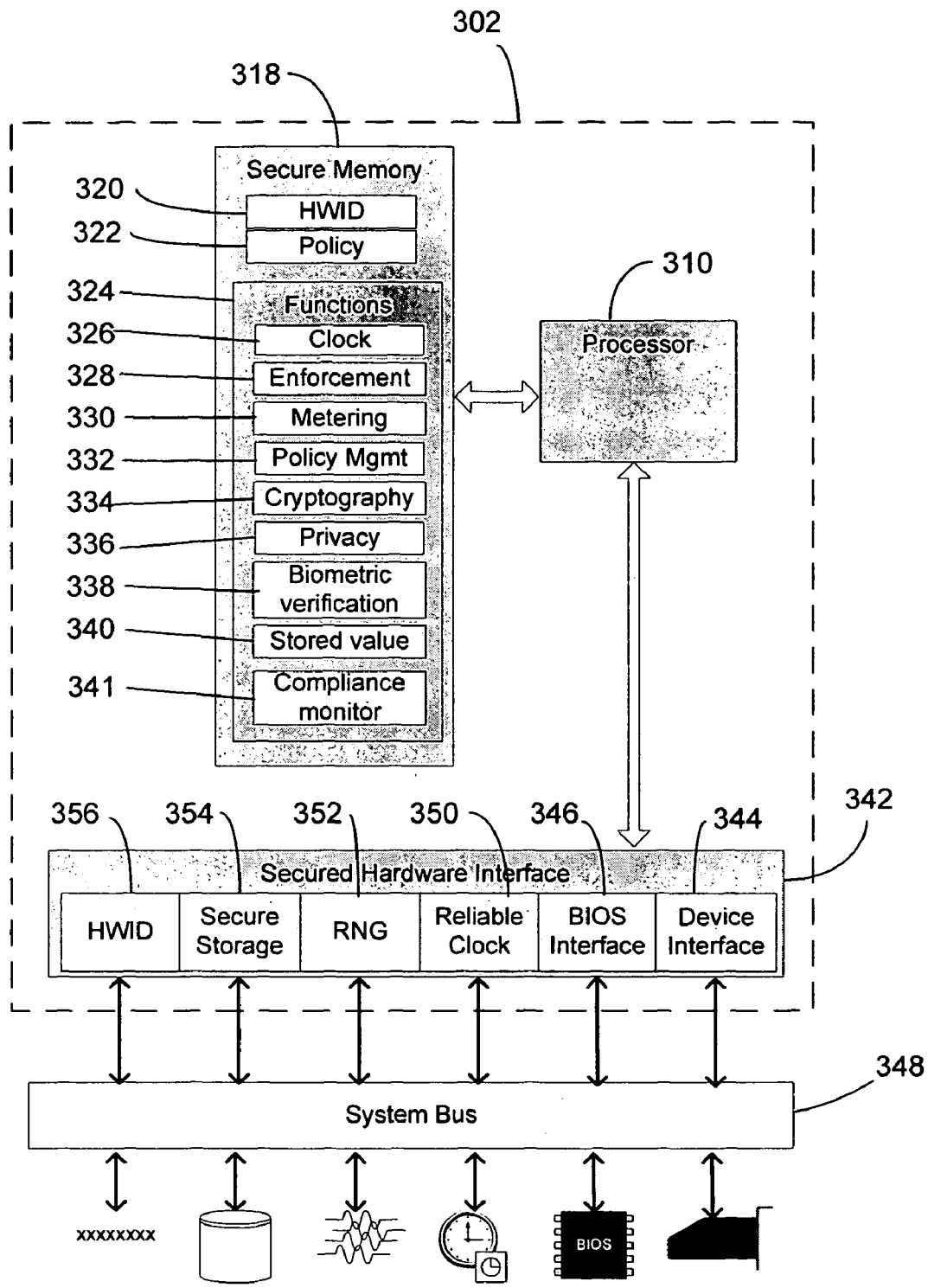
FIG. 3 is a block diagram of a secure execution environment.

FIG. 3 is a block diagram of an exemplary secure execution environment 302, such as may be found in computer 200 of FIG. 2. The secure execution environment 302 may include a processor 310, a secure memory 318 and an interface 342.

The secure memory 318 may store, in a tamper-resistant manner, code and data related to the secure operation of the computer 302, such as a hardware identifier 320 and policy information 322. The policy information 322 may include data related to the specific terms and conditions associated with the operation of the computer 200. The secure memory 318 may also include code or data required to implement various functions 324. The functions 324 may include a clock 326 or timer implementing clock functions, enforcement functions 328, metering 330, policy management 332, cryptography 334, privacy 336, biometric verification 338, stored value 340, and compliance monitoring 341, to name a few.

The clock 326 may provide a reliable basis for time measurement and may be used as a check against a system clock maintained by the operating system 134 to help prevent attempts to fraudulently use the computer 200 by altering the system clock. The clock 326 may also be used in conjunction with policy management 332, for example, to require communication with a host server to verify upgrade availability. The enforcement functions 328 may be executed when it is determined that the computer 200 is not in compliance with one or more elements of the policy 322. The actual enforcement mechanisms may be located in different functional blocks of the computer 200, as shown in various exemplary embodiments in FIGS. 4-6. The enforcement mechanisms may vary based on the location of the enforcement function, that is, the enforcement function host device may be used to implement the enforcement function.

Figure 4:
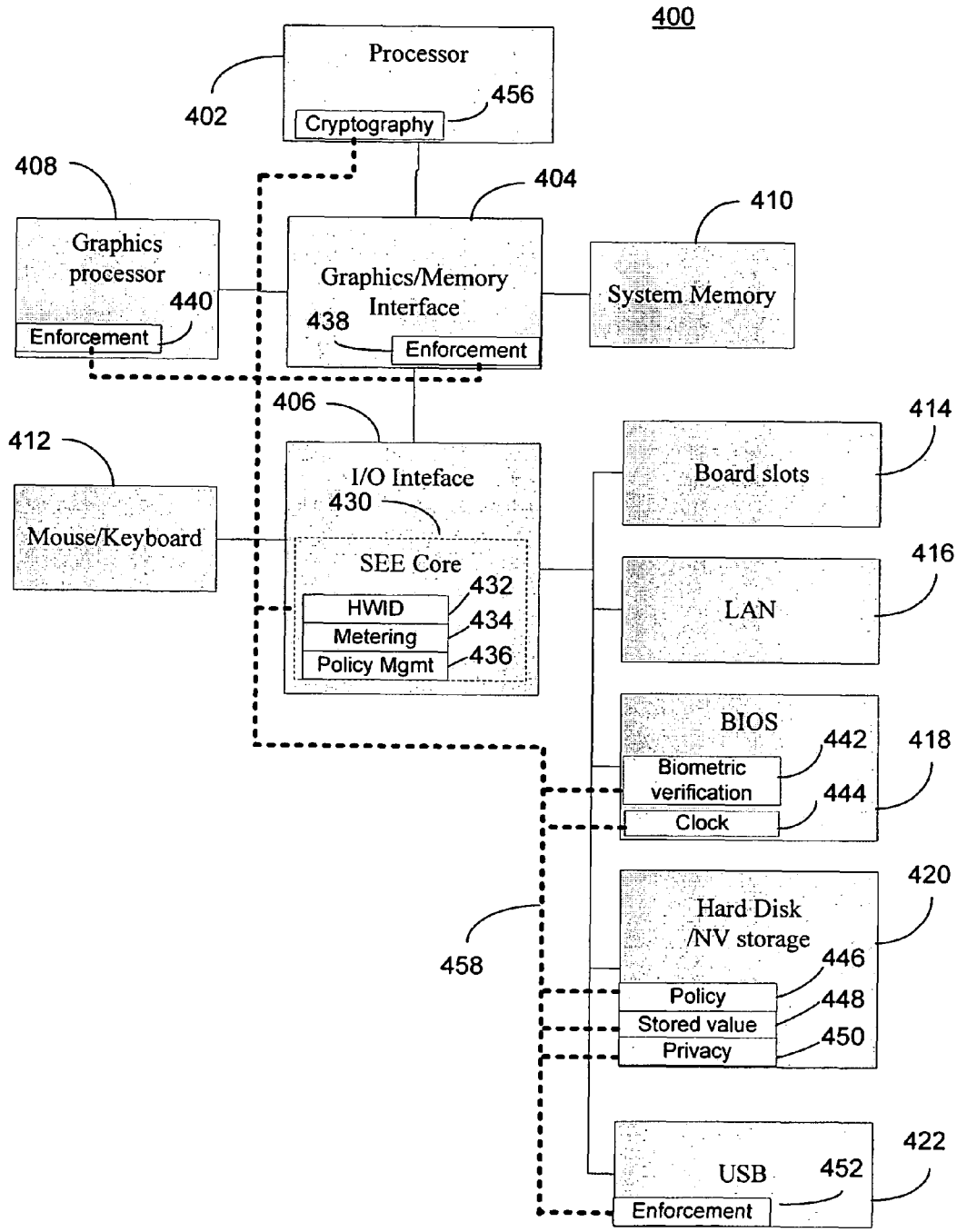
FIG. 4 is an architectural block diagram of an alternate embodiment of the computer of FIG. 2 with a disaggregated SEE.

Referring briefly to FIG. 4, when the enforcement function 438 is located in the graphics/memory interface 404, the enforcement function may be a memory bus reduction mechanism or a graphic display limitation mechanism. A memory bus reduction mechanism may be used to reallocate system memory to a non-addressable region, making it unavailable to the processor 402. Similarly, a memory bus reduction mechanism may slow memory access to limit the usefulness of the computer 400. A graphic display limitation may take the form of limiting the displayed pixels or the color depth of the display to restrict operation of advanced features.

When located in an input/output interface, such as I/O interface 406, a peripheral device filtering enforcement function may restrict access to certain peripherals, or reduce the interface data rate, making communication with peripherals or a network connection something between annoying and impossible. When an enforcement function is located in a processor 402, a processor speed reduction function may be used to enforcement a limited function mode by slowing instruction processing. In another embodiment, the enforcement mechanism may be to reduce the instruction set available for processing commands. A combination, such as using a restricted set of instructions to execute a program from a limited memory range may be effective.

Returning to FIG. 3, another function 324 may be metering 330. Metering 330 may include a variety of techniques and measurements, for example, those discussed in co-pending U.S. patent application Ser. No. 11/006,837. Whether to meter and what specific items to measure may be a function of the policy 322. The selection of an appropriate policy and the management of updates to the policy may be implemented by the policy management function 332.

A cryptography function 334 may be used for digital signature verification, digital signing, random number generation, and encryption/decryption. Any or all of these cryptographic capabilities may be used to verify updates to the secure memory 318 or to established trust with an entity outside the secure execution environment 302 whether inside or outside of the computer 200.

The secure execution environment 302 may allow several special-purpose functions to be developed and used. A privacy manager 336 may be used to manage personal information for a user or interested party. For example, the privacy manager 336 may be used to implement a "wallet" function for holding address and credit card data for use in online purchasing. A biometric verification function 338 may be used with an external biometric sensor (not depicted) to verify a personal identity. Such identity verification may be used, for example, to update personal information in the privacy manager 336 or when applying a digital signature. The cryptography function 334 may be used to establish trust and a secure channel to the external biometric sensor.

A stored value function 340 may also be implemented for use in paying for time on a pay-per-use computer or while making external purchases, for example online stock trading transactions.

The use of data and functions from the secure memory 318 allows presentation of the secured hardware interface 342 for access by other systems in the computer 200. The secured hardware interface 342 may allow restricted and or monitored access to peripheral devices 344 or the BIOS 346 via the system bus 348. Additionally, the functions 324 may be used to allow external programs, including the operating system 134, to access secure facilities such as hardware ID 356 and random number generation 352 of the cryptographic function 334 via the secured hardware interface 342. Other capabilities accessible via the system bus 348 may include secure storage 354 and a reliable (monotonically increasing) clock 350.

Each function 324 discussed above, as implemented in code and stored in the secure memory 318 may be implemented in logic and instantiated as a physical circuit. The operations to map functional behavior between hardware and software are well known in the art and are not discussed here in more detail.

In one embodiment, the computer 200 may boot using a normal BIOS startup procedure. At a point when the operating system 134 is being activated, the processor 310 may execute the policy management function 332. The policy management function 332 may determine that the current policy 322 is valid and then load the policy data 322. The policy may be used in a configuration process to set up the computer 200 for operation. The configuration process may include allocation of memory, processing capacity, peripheral availability and usage as well as metering requirements. When metering is to be enforced, policies relating to metering, such as what measurements to take may be activated. For example, measurement by CPU usage (pay-per-use) versus usage over a period of time (subscription), may require different measurements. Additionally, when usage is charged per period or by activity, a stored value balance may be maintained using the stored value function 340.

When the computer 300 has been configured according to the policy 322, the normal boot process may continue by activating and instantiating the operating system 134 and other application programs 135. In other embodiments, the policy may be applied at different points in the boot process or normal operation cycle. Should non-compliance to the policy be discovered, the enforcement function 328 may be activated. A discussion of enforcement policy and actions may be found in co-pending application U.S. patent application Ser. No. 11/152,214. The enforcement function 328 may place the computer 300 into an alternate mode of operation when all attempts to restore the computer to compliance with the policy 322 fail. For example, in one embodiment, a sanction may be imposed by reallocating memory from use as system memory 130 and designating it use by the secure execution environment 302. Since memory in the secure execution environment may not addressable by outside programs including the operating system 134, the computer's operation may be restricted, even severely, by such memory allocation.

Because the policy and enforcement functions are maintained within the secure execution environment 302, some typical attacks on the system are difficult or impossible. For example, the policy may not be "spoofed" by replacing a policy memory section of external memory. Similarly, the policy and enforcement functions may not be "starved" by blocking execution cycles or their respective address ranges.

To revert the computer 300 to normal operation, a restoration code may need to be acquired from a licensing authority or service provider (not depicted) and entered into the computer 300. The restoration code may include the hardware ID 320, a stored value replenishment, and a "no-earlier-than" date used to verify the clock 326. The restoration code may typically be encrypted and signed for confirmation by the processing unit 302.

FIG. 4, an architectural diagram of a computer 400 shows another embodiment of a secure execution environment having disaggregated functions. The computer 400 may be the same as or similar to computer 200 of FIG. 2. The computer 400 may have a processor 402, a graphics and memory interface 404 and an I/O interface 406. Coupled to the graphics and memory interface 104 may be a graphics processor 408 and system memory 410. Coupled to the I/O interface 406 may be one or more input devices 412, such as a keyboard and mouse, board slots 414 for accepting a variety of interface boards (not depicted), a local area network interface 416, firmware, such as the basic input output system 418 (BIOS), nonvolatile storage, such as a hard disk 420, and a universal serial bus 422 (USB), to name a few.

A secure execution environment may be disaggregated among two or more elements of the computer 400. The functions associated with the secure execution environment, as shown and described with respect to FIG. 3, may be disaggregated in any number of configurations and combinations, depending on the resources available within a given component in the design choices available to a system engineer or architect. In the exemplary embodiment depicted in FIG. 4, a secure execution environment (SEE) core 430 is shown embedded in the I/O interface 406. The SEE core 430 may include the hardware ID 432, a metering function 434, and a policy management function 436. The SEE core 430 may serve as a hub or controller for the functioning of the disaggregated secure execution environment. The enforcement functions 438, in the graphics and memory interface 404, and 440, in the graphics processor 408, may have the ability to effect a range of sanctions in their respective hosts. For example, the enforcement function 438 may have the ability to limit system memory 410 and impacts the overall performance of the computer 400. The enforcement function 440 may be able to reduce the size, speed, or color depth supported by the graphics processor 408. Processor and graphic/memory interface-based secure execution environment components, such as enforcement 438 and cryptography 456 may communicate via standard memory or I/O mapped interfaces supported on the existing front-side bus. Other options for piggybacking communication on existing buses, such as the peripheral component interconnect (PCI), may require modification of existing implementations to insert a software handler for routing inter-element packets. Given the nature of the communications between disaggregated elements, individual peer connections may be maintained, particularly between the SEE core 430 and other individual elements, such as stored value 448 and the various exemplary enforcement modules 438 440 452.

Biometric verification 442 and the clock 444 may be implemented in the BIOS 418. Data only values associated with secure execution environment functions may be stored in a conventional nonvolatile memory. For example, policy information 446, stored value 448, and privacy information 450 may be stored in a hard disk 420. Executable code associated with implementing these functions may also be stored in the hard disk 420. The USB interface 422 may also be another location where and enforcement function 452 may be placed. Enforcement at the USB interface 422 may restrict access to various peripherals, such as other nonvolatile memory, cameras, or digital media devices. A processing intensive function, such as cryptography 456, may be located in the processor 402 although while the cryptography function 456 may use the native processing power of the processor 402, the cryptography function 456 may also be implemented as a standalone function hosted in that chip.

The distribution of the functions of the secure execution environment may require some additional overhead to support communication and verification among the separated functions. For example, each of the disaggregated functions may need some ability to communicate and some ability to determine that messages received are authentic. To that end, each of the disaggregated functions may have its own identifier and a cryptographic key. Distributed data such as policy 446 or stored value 448 information may not need these extra measures.

When storing distributed data, such as policy 446 or stored value 448, the SEE core 430 may have several options. If the SEE core 430 has encryption capability, distributed data may be encrypted locally and stored remotely. If the SEE core 430 has only hashing capability, that is, no local secure storage for an encryption key, the SEE core 430 may keep a hash and store the clear data remotely.

Figure 5:
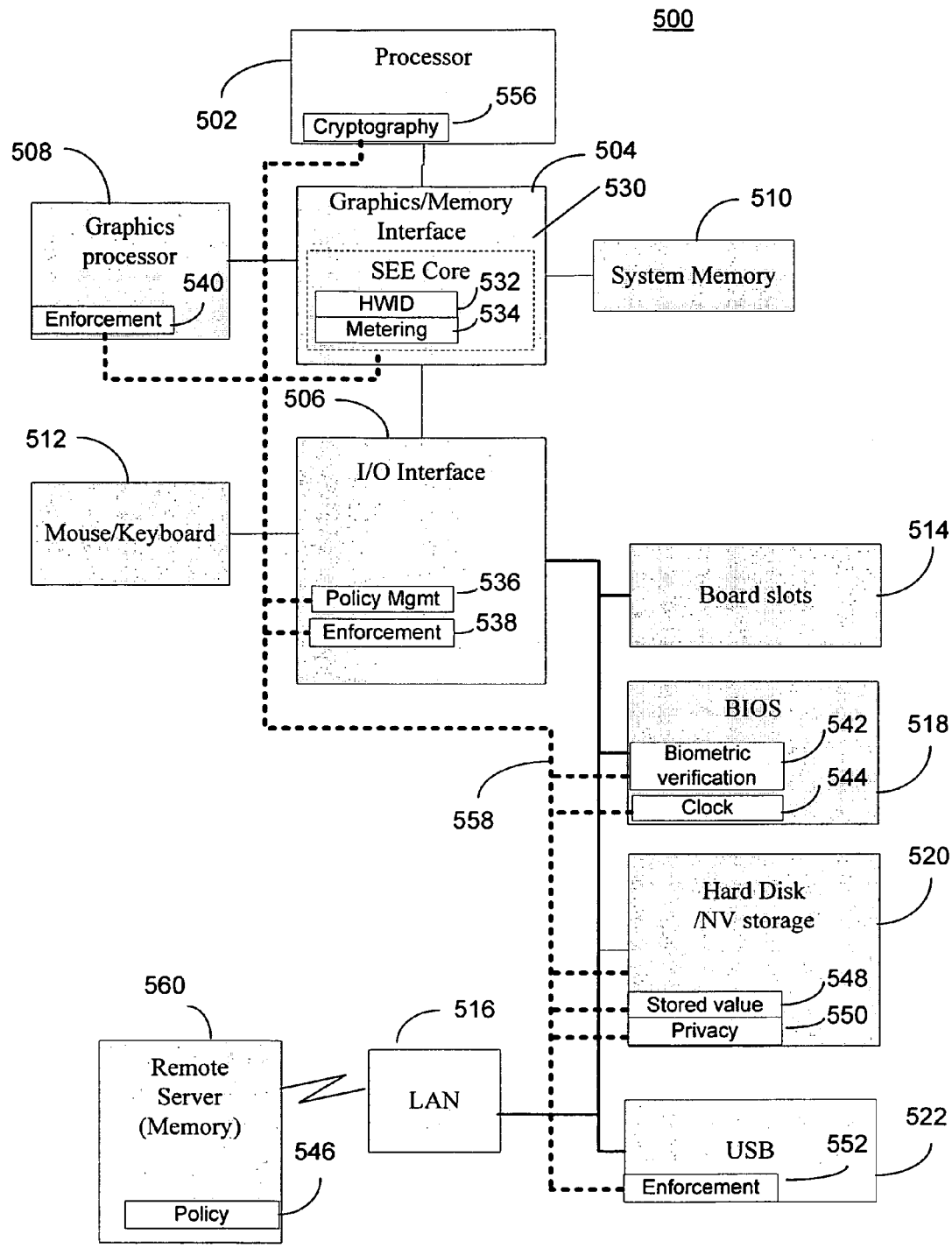
FIG. 5 is another embodiment of a computer with a disaggregated SEE.

Communication between the SEE core 430 and the disaggregated functions of the secure execution environment may be accomplished using the existing bus structure coupling each of the host components. For example, communication between the SEE core in the enforcement function 440 may be accomplished over the bus coupling the graphics and memory interface 404 with the graphics processor 408. In another embodiment, a separate bus 458 may be implemented to connect the SEE core 430 and the disaggregated functional components of the secure execution environment 438-456. A relatively slow, narrow bus may be suitable for such communication. For example, a two-wire bus known as an inter-integrated circuit bus (IIC or I2C) may be suitable for such interconnection FIG. 5 depicts another embodiment of a disaggregated secure execution environment. A computer 500 may have components that are largely as depicted in FIG. 4. There may be a processor 502, a graphic and memory interface 504, and an I/O interface 506. The graphic and memory interface may support a graphics processor 508 and system memory 510. The I/O interface may support devices or peripheral interfaces such as input devices 512, such as a mouse and keyboard, board slots 514, BIOS memory 518, non-volatile memory, such as hard disk 520, a USB port 522 and a network interface, such as LAN interface 516. The LAN interface 516 may be in communication with a remote server 560 that may supply additional non-volatile data storage.

In the embodiment depicted in FIG. 5, a secure execution environment may have a secure execution environment core 530 disposed in the graphics and memory interface 504. Other data and functions associated with the operation of the SEE may be co-located with the SEE core 530, such as the hardware identifier 532 and the metering function 534. Additional functions such as policy management 536 and enforcement 538 may be disposed in the I/O interface 506, while another enforcement function 540 may be located in the graphics processor 508. Biometric verification 542 and clock functions may be located in the BIOS firmware 518 and the hard disk 520 may host the stored value function and data 548 and privacy information 550. The USB interface may host another enforcement function 552.

To illustrate disaggregating the SEE beyond the local computer, the embodiment of FIG. 5 shows the policy information 546 stored on the remote server 560. The policy information 546 may be specific to computer 500 or may be shared by other computers (not depicted), making global policy changes available to a given set of computers. Other elements of the SEE may also be remotely located, for example, stored value, biometric verification, or both may be remotely located given properly protected communication mechanisms.

Figure 6:
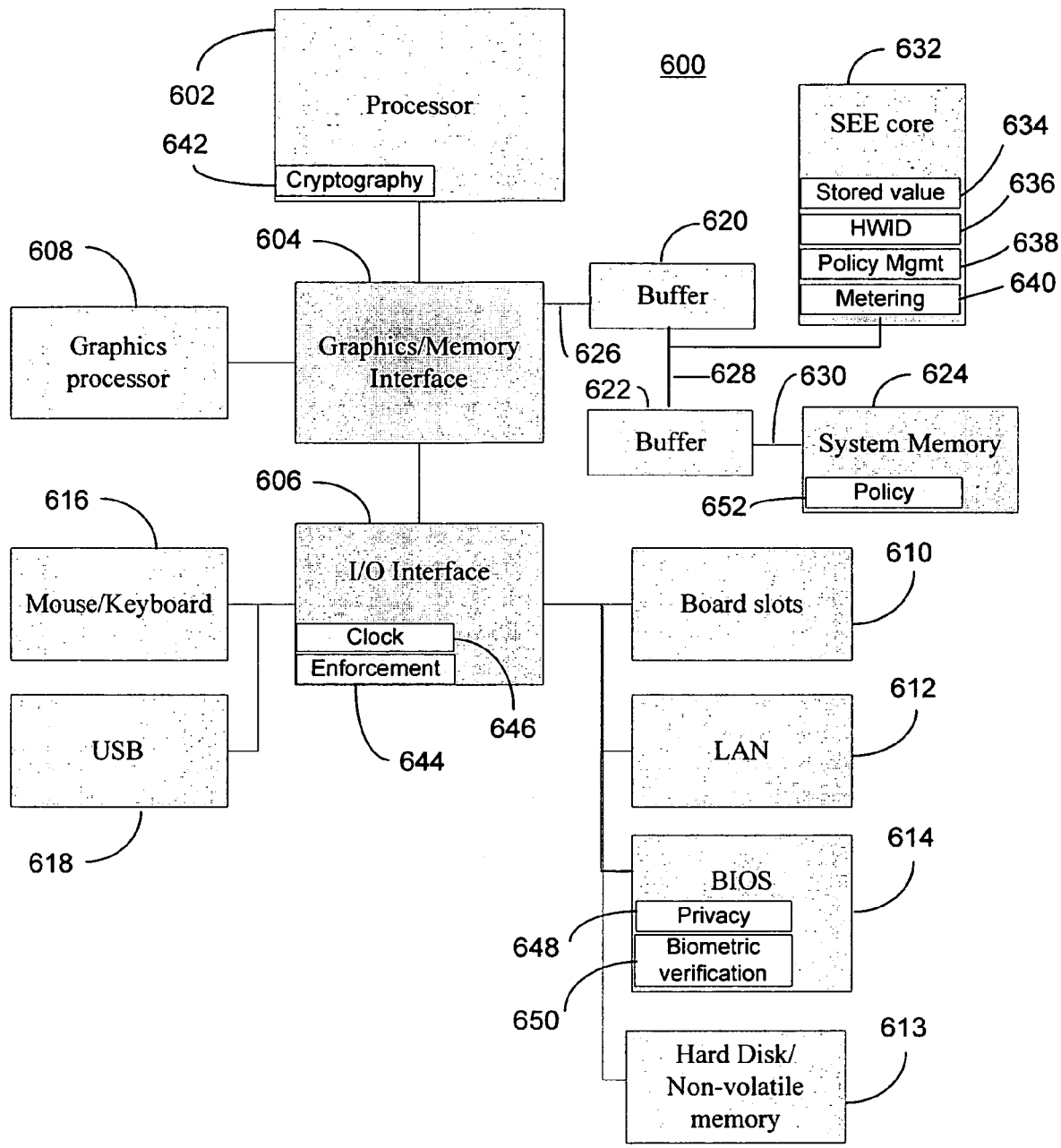
FIG. 6 is yet another embodiment of a computer with a disaggregated SEE.

FIG. 6 is a block diagram of another alternative configuration of a disaggregated secure execution environment. As above, the base elements of the computer may include a processor 602, a graphics and memory interface 604, and an I/O interface 606. The graphic and memory interface 604 may support a graphics processor 608. The I/O interface may support devices or peripheral interfaces such as input devices 616, such as a mouse and keyboard, board slots 610, BIOS memory 614, non-volatile memory, such as hard disk 613, a USB port 618 and a network interface, such as LAN interface 612.

Different from the above embodiments of FIGS. 4 and 5, the system memory arrangement of FIG. 6 has been modified to support a standalone SEE core 632. The system memory 624, in the embodiment shown, is coupled to the graphics and memory interface 606 through a combination of memory buffers 620 622. In one embodiment, the memory buffers 620 622 may be an advanced memory buffer (AMB), a standard circuit, known in the industry and available from manufacturers such as NEC Corporation of Japan, part number uPD720900. One application of the memory buffers 620 622 is to convert a high speed serial interface to a parallel interface supported by common computer memory chips (DRAM). However, the use of such a memory buffer to interface to the SEE core 632 allows direct interaction with the graphics and memory interface 604 without the high data rate requirements of the graphics and memory interface 604 and without further loading of the interface 626. The memory buffer 620 converts a high speed parallel interface 626 to a serial interface 628. To interface to existing, common memory, another memory buffer 622 may be used to convert memory signals back to the original format found at interface 626, for coupling to the system memory 624. In one embodiment, the memory buffers 620 622 may be an advanced memory buffer (AMB), a standard circuit, known in the industry and available from manufacturers such as NEC Corporation of Japan, part number uPD720900. In other embodiments, the memory buffers 620 622 may be application specific integrated circuits.

This configuration allows a hybrid implementation of a standalone SEE core 632 with local functions for stored value 634, hardware ID 636, policy management 638 and metering 640, with other functions distributed among other components. For example, one embodiment may have a cryptography function 642 in the processor 602, enforcement 644 and clock 646 hosted in the I/O interface 606, privacy 648 and biometric verification 650 in the BIOS firmware 614, and policy data 652 in the system memory 624.

Figure 6A:
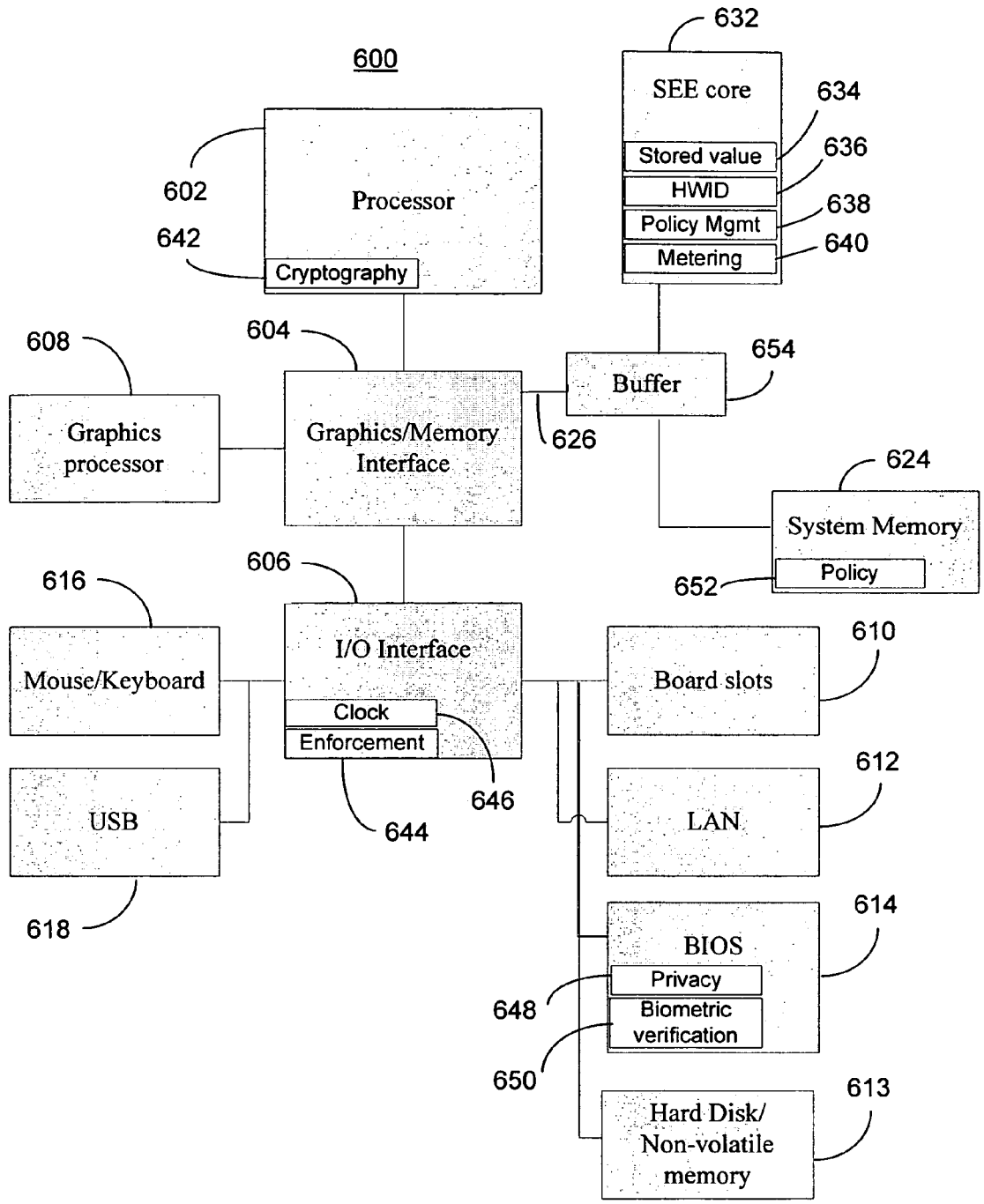
FIG. 6A is another embodiment of the computer of FIG. 6.

FIG. 6A shows another embodiment of the computer 600 of FIG. 6, specifically, showing another method of coupling the SEE core 632 to the graphics and memory interface 604. A single buffer 654 may be used in place of the paired buffers 620 622 of FIG. 6. The buffer 654 may simply performing the impedance matching necessary to allow the SEE core 632 to sit on the memory bus 626, or may have additional functions associated with metering and/or enforcement.

The exemplary embodiments above illustrate several configurations for distributing functions of a secure execution environment through different elements of a computer. The effect is to both distribute the risk, and also the point of attack, throughout a computer and to help ensure that original equipment components are not removed or altered other than by authorized service personnel. This helps protect the investment of underwriters who may have a significant financial interest in protecting the computer from attack both logical and physical.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A computer adapted for use in limited function operating modes comprising:
   a secure hardware interface providing an interface between a secure execution environment and a plurality of functional circuits of the computer;
   the plurality of functional circuits including at least two or more of a processor, a graphics processor, an I/O interface, a BIOS memory, a non-volatile storage memory, and an external bus interface, each of the plurality of functional circuits connected via a bus external to the plurality of functional circuits;
   a secure execution environment having secure storage and controlling disaggregated enforcement functions in each of the respective functional circuits, the secure execution environment including at least a metering function that monitors usage of the computer according to a policy at least partly secured in the secure execution environment;
   the metering function measuring usage against a stored value in the secure storage; and
   at least a first of the enforcement functions in a first of the functional circuits, when activated by the enforcement function, in turn activates a limited function mode in the first functional circuit when the metering function determines usage is not in compliance with the policy, the limited function mode removing or reducing some but not all functionality of the first functional circuit such that at least some functionality of the first functional circuit continues to be available for use by the computer.

2. The computer of claim 1, wherein the secure execution environment comprises a circuit of the computer and further comprising:
   a secure memory storing at least a hardware identifier;
   a clock providing monotonically increasing time;
   a cryptography function; and
   a policy management function for updating the policy.

3. The computer of claim 2, wherein the secure memory, clock, cryptography function, and policy management function are each communicatively coupled with one or more of the plurality of functional circuits.

4. The computer of claim 1, wherein secure execution environment includes a dedicated data bus physically separate from the bus external to the plurality of functional circuits and providing communication between components of the secure execution environment.

5. The computer of claim 1, wherein the secure execution environment further comprises a core for managing communication between the components of the secure execution environment.

6. The computer of claim 5, wherein the core is part of the processor.

7. The computer of claim 5, wherein the plurality of functional circuits comprises an interface chip that supports memory access and the core is part of the interface chip.

8. The computer of claim 5, wherein the plurality of functional circuits comprises an interface chip that supports peripheral component access and the core is part of the interface chip.

9. The computer of claim 5, wherein the core is a standalone chip.

10. The computer of claim 1, wherein the first enforcement function comprises a memory bus reduction function located in a graphics/memory interface and reducing throughput of the memory bus.

11. The computer of claim 1, further comprising an input/output interface and a graphics/memory interface, wherein the first functional circuit is part of the input/output interface and a second functional circuit is part of the graphics/memory interface.

12. The computer of claim 1, further comprising an input/output interface and a graphics processor, wherein the first security function is part of the input/output interface.

13. The computer of claim 1, further comprising a graphics/memory interface and a graphics processor, wherein the first security function is part of the graphics/memory interface.

14. The computer of claim 1, further comprising a graphics/memory interface and an input/output interface, wherein the first security function is part of the input/output interface.

15. The computer of claim 1, wherein the first security function is part of the external bus interface.

16. The computer of claim 1, wherein the secure execution environment restores functionality in response to validating a restoration code received after activation of the limited function mode.

17. The computer of claim 1, wherein the activated enforcement function changes a speed of the processor.

* * * * *